3,212,958
POLYGLYCIDYL ETHERS OF HYDROXYBENZYL-
ATED 4,4' - DIHYDROXYDIPHENYL SULFONES
AND LAMINATES CONTAINING SAME
Ralph F. Sellers, Middlebush, N.J., assignor to Union
Carbide Corporation, a corporation of New York
No Drawing. Filed Sept. 1, 1961, Ser. No. 135,449
31 Claims. (Cl. 161—184)

This invention relates to curable polyglycidyl ethers produced on reacting an epihalohydrin with a hydroxybenzylated derivative of 4,4'-dihydroxydiphenyl sulfone. More particularly, this invention relates to curable polyglycidyl ethers of hydroxybenzylated-4,4'-dihydroxydiphenyl sulfones which are especially useful as laminating varnishes for bonding layers of mineral fiber cloth into a unitary structure, and as protective coatings on wood, metal and other like surfaces.

The polyglycidyl ethers of this invention are polyglycidyl ethers of hydroxybenzylated-4,4'-dihydroxydiphenyl sulfones of the formula:

FORUMLA I

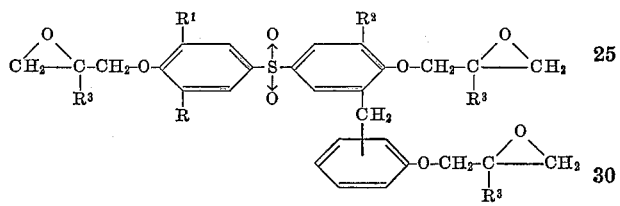

wherein $R^3$ is hydrogen or methyl ($CH_3$—); R, $R^1$ and $R^2$, which can be the same or different, are either hydrogen or a benzylglycidyl ether radical of the formula:

FORMULA II

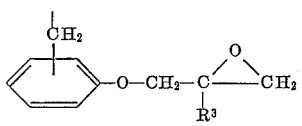

with $R^3$ being as previously defined and wherein the methylene radical of Formula II is attached to the phenyl radical in a position other than meta to the glycidyl ether radical.

The hydroxybenzylated-4,4'-dihydroxydiphenyl sulfones which are reacted with an epihalohydrin to produce the polyglycidyl ethers of this invention are those having the formula:

FORMULA III

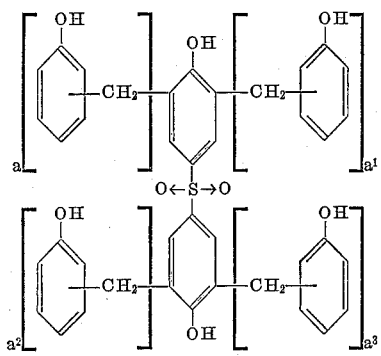

wherein $a$, $a^1$, $a^2$ and $a^3$, which can be the same or different, are integers having values of 0 to 1 inclusive with the sum of said integers being at least 1 and with the further limitation that the methylene radical which links the aryl radicals is in a position other than meta to the hydroxy of the hydroxy phenyl radical.

Exemplary of suitable hydroxybenzylated-4,4'-dihydroxydiphenyl sulfones that can be reacted with an epihalohydrin to produce the polyglycidyl ethers of this invention are: hydroxybenzyl - 4,4' - dihydroxydiphenyl sulfone, 3,5 - di(hydroxybenzyl)-4,4'-dihydroxydiphenyl sulfone, 3,3'-di(hydroxybenzyl) - 4,4'-dihydroxydiphenyl sulfone, 3,3',5,5'-tetra(hydroxybenzyl)-4,4'-dihydroxydiphenyl sulfone, and 3,3',5-tri(hydroxybenzyl)-4,4'-dihydroxydiphenyl sulfone.

For a detailed discussion of hydroxybenzylated-4,4'-dihydroxydiphenyl sulfones and methods for their preparation, reference is made to the copending application of C. Y. Meyers et al., Serial No. 135,453, entitled "Hydroxybenzylated Sulfones and Compositions Containing Same," filed concurrently herewith, which is incorporated herein by reference.

Methylolated 4,4'-dihydroxydiphenyl sulfones, from which the hydroxybenzylated compounds are produced, and methods for their preparation are described in copending application of C. Y. Meyers, Serial No. 135,451, entitled Methylolated 4,4'-Dihydroxydiphenyl Sulfones, which is incorporated herein by reference.

Exemplary of suitable epihalohydrins that can be reacted with the hydroxybenzylated-4,4'-dihydroxydiphenyl sulfones to produce the polyglycidyl ethers of this invention can be noted epihalohydrins of the formula:

FORMULA IV

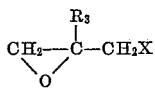

wherein $R^3$ is either a hydrogen or a methyl radical and X is a halogen, e.g., chlorine or bromine.

In conducting the reaction between an epihalohydrin and a hydroxybenzylated-4,4'-dihydroxydiphenyl sulfone, various amounts of the reactants can be employed. Generally, the amount of an epihalohydrin employed will be at least 1 mole per each OH equivalent of the hydroxybenzylated-4,4'-dihydroxydiphenyl sulfone, and preferably from about 3 to about 4 moles of epihalohydrin per OH equivalent. More than about 4 moles of an epihalohydrin per OH equivalent can be used, but this results in little improvement in the yield of polyglycidyl ether.

The reaction between an epihalohydrin and a hydroxybenzylated-4,4'-dihydroxydiphenyl sulfone is usually carried out utilizing a catalyst which provides an alkaline reaction medium for the reaction. As a rule the catalysts used serve a dual purpose. Initially, they serve to catalyze the reaction of an epihalohydrin with a hydroxybenzylated-4,4'-dihydroxydiphenyl sulfone to form the corresponding halohydrin ether and subsequently they serve to dehydrohalogenate the halohydrin ether to the corresponding polyglycidyl ether.

For a detailed discussion of suitable procedures to be used in conducting the reaction between an epihalohydrin and a hydroxybenzylated-4,4'-dihydroxydiphenyl sulfone, including a discussion of suitable catalysts, suitable reaction temperatures and the like reference is made to U.S. Patent 2,943,095 to A. G. Farnham et al., which is incorporated herein by reference.

As previously stated, the polyglycidyl ethers of this invention have particular utility for use as laminating varnishes. When the polyglycidyl ethers are to be used as laminating varnishes, they are dissolved in solvents which are inert and non-deleterious thereto such as acetone, methyl ethyl ketone and the like and a suitable curing agent added thereto. Generally, these laminating varnishes have a solids content, based upon the weight of the polyglycidyl ether, of about 60 to about 70 percent by weight.

Fabrics, such as glass or asbestos fiber fabrics, which are to be laminated, are then impregnated with the laminating varnish. Upon heating the impregnated material, the solvent is driven off. Layers of the impregnated material are then stacked one on another and subjected to heat and pressure. On applying pressure and more heat, the composition cures to an infusible product bonding together the fabric layers into a unitary structure. The actual pressures and temperatures employed will, of course, vary and depend in part upon the exact composition used.

Curing agents are generally classified as hardeners, that is curing agents which themselves react with the polyglycidyl ethers or are classified as catalysts, that is curing agents which promote the self-reaction of the polyglycidyl ethers.

When used, the hardener is present in amounts of from about 75 percent of stoichiometric to about 15 percent in excess of stoichiometric and preferably from about 90 percent of stoichiometric to about 10 percent in excess of stoichiometric.

In those instances wherein the curing agent used is a catalyst, the catalyst is used in amounts of from about 0.2 to 5 percent by weight, preferably from about 0.5 to about 2 percent by weight, based on the weight of the polyglycidyl ether. More than about 5 percent by weight of catalyst can be used but this does not materially decrease the time of the curing cycle of the compositions and is therefore economically undesirable.

Illustrative of suitable hardening agents are those compounds containing replaceable hydrogen atoms, as for example the polyamines of the formula:

FORMULA V

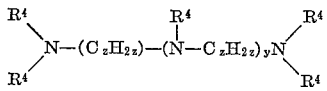

wherein $y$ is an integer from zero to 3 inclusive, $z$ is an integer from 2 to 6 inclusive, $R^4$ in each instance is a monovalent substituent being either hydrogen or a hydroxyalkyl group wherein the alkyl group preferably contains from 1 to 4 carbon atoms inclusive, as for example, hydroxyethyl and hydroxypropyl, the hydroxyalkyl groups in any molecule not necessarily being the same, and the number of instances per molecule where $R^4$ represents a hydroxyalkyl group being a whole number which is at least one, but less than $y+2$.

Typical hydroxyalkyl alkylene polyamines coming within the scope of the above structural formula are the following: N-hydroxyethyl ethylenediamine, N-hydroxyethyl pentamethylenediamine, N-hydroxypropyl tetramethylenediamine, N-hydroxyethyl diethylenetriamine, N,N-dihydroxyethyl diethylenetriamine, N,N''-dihydroxyethyl diethylenetriamine, N-hydroxypropyl diethylenetriamine, N,N-dihydroxypropyl diethylenetriamine, N,N''-dihydroxypropyl diethylenetriamine, N-hydroxyethyl propylenediamine, N-hydroxypropyl propylenediamine, N-hydroxyethyl dipropylenetriamine, N,N-dihydroxyethyl dipropylenetriamine, N,N'-dihydroxyethyl dipropylenetriamine, tris-hydroxyethyl triethylenetetramine and the like.

Preparation of hydroxyalkyl alkylene polyamines is described in U.S. Patent 2,901,461 to V. Auerbach et al., issued August 25, 1959.

Other suitable polyamine hardeners include, among others, the adducts formed on reacting at temperatures of about 0° C. to about 150° C. a polyamine having Formula V, previously noted or a polyamine of the formula:

FORMULA VI

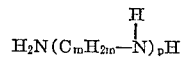

wherein $m$ has a value of from 2 to 10 inclusive, preferably from 2 to 6 inclusive and $p$ has a value of from 1 to 6 inclusive, preferably 1 to 4 inclusive, with at least about 0.5 mole and preferably from about 0.5 to about 2.0 moles, per mole of amine, of an acrylate of the formula:

FORMULA VII

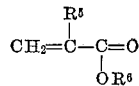

wherein $R^6$ is an alkyl radical, preferably containing from 1 to 18 carbon atoms inclusive; $R^5$ is either hydrogen or an alkyl radical containing from 1 to 2 carbon atoms inclusive.

Among suitable polyamines falling within the scope of Formula VI are: 1,2-diaminoethane, 1,3-diaminopropane, 1,4-diaminobutane, 1,5-diaminopentane, 1,6-diaminohexane, 1,8-diaminooctane, 1,9-diaminononane, 1,10-diaminodecane, diethylenetriamine, triethylenetetramine, tetraethylenepentamine, dipropylenetriamine and the like. Illustrative of acrylates coming within the purview of Formula VII which can be reacted with the polyamines to produce the amine-acrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, n-pentadecylacrylate, n-octadecylacrylate, methylmethacrylate, methylethacrylate, isopropylmethacrylate, n-hexylmethacrylate, n-nonylmethacrylate, ethylethacrylate, n-butylethacrylate, n-amylethacrylate, n-hexylethacrylate, 2-ethylhexylethacrylate, n-octadecylethacrylate and the like.

In addition to the amines noted, other suitable amine hardening agents are: 2-aminoethanol, 2-aminopropanol, 3-aminobutanol, 1,3-diamino-2-propanol, m-aminophenol, p-aminophenol, 4,4'-methylene dianiline, m-phenylene diamine, diethylenetriamine and the like.

For purposes of stoichiometric calculations with respect to amines, one aminohydrogen atom is deemed to react with one epoxy group; as to amino phenols, stoichiometry is based on replaceable hydrogen atoms, that is aminohydrogens and hydrogens of the hydroxyl groups.

Exemplary of other suitable hardening agents are the phenols as for example, phenol, o-cresol, m-cresol, p-cresol, o-chlorophenol, m-chlorophenol, p-chlorophenol, p-bromophenol, 2,4,6-trichlorophenol, 2,4,6-tribromophenol, guaiacol, anol eugenol, iso-eugenol, saligenin, carvacrol, thymol, o-hydroxyacetophenone, p-hydroxyacetophenone, p-hydroxydiphenyl, o-hydroxydiphenyl, o-cyclohexylphenol, m-cyclohexylphenol, p-cyclohexylphenol; polyhydric phenols such as catechol, hydroquinone, hydroxyhydroquinone, chloroglucinol, resorcinol and pyrogallol; the di- or poly-nuclear phenols such as the bisphenols described in Bender et al., U.S. Patent 2,506,486, and polyphenylols such as novolak condensates of a phenol and a saturated or unsaturated aldehyde containing an average of from 3 to 20 or more phenylol groups per molecule (cf. book by T. S. Carswell entitled "Phenoplasts," published in 1947 by Interscience Publishers of New York). Examples of suitable polyphenylols derived from a phenol and an unsaturated aldehyde such as acrolein, are the triphenylols, pentaphenylols and heptaphenylols described in U.S. Patent 2,885,385 to A. G. Farnham, issued May 5, 1959.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Patent 2,506,486).

The polyhydric polynuclear phenols can consist of 2 or more phenols connected by such groups as methylene, alkylene, ether, ketone or sulfone. The connecting groups are further exemplified by the following compounds: bis(p-hydroxyphenyl) - ether, bis(p - hydroxyphenyl)-ketone, bis(p-hydroxyphenyl)-methane, bis(p-hydroxyphenyl) - dimethyl methane, bis(p - hydroxyphenyl)-sulfone and the like.

For purposes of stoichiometric calculations with respect to phenols, one hydroxyl group is deemed to react with one epoxy group.

In addition to the hardening agents previously listed, polycarboxylic acids and anhydrides thereof can also be employed. Among suitable polycarboxylic acids are those of the formula:

FORMULA VIII

HOOC—(CH$_2$)$_f$—COOH wherein $f$ is an integer generally having a value of from 1 to 20 inclusive, as for example, malonic, succinic, glutaric, adipic, pimelic, suberic, azelaic, sebacic and the like. Other examples of suitable acids are phthalic acid, isophthalic acid, terephthalic acid and the like as well as the anhydrides of the acids noted above. Further acids which can be used as hardening agents are enumerated in U.S. Patent 2,918,444 to B. Phillips et al., issued December 22, 1959.

For purposes of stoichiometric calculations with respect to acids and anhydrides thereof, one carbonyl group is deemed to react with one epoxy group.

As previously stated, in those instances wherein catalysts are used, they are generally employed in amounts of from about 0.2 to about 5% by weight based on the weight of the polyglycidyl ether. As examples of suitable catalysts are the metal halides exemplified by boron trifluoride, stannic chloride, zinc chloride, ferric chloride and the like as well as the etherates and amine complexes of such metal halides.

The following examples further illustrate this invention; in addition to these examples, it is apparent that other variations and modifications thereof can be adopted to obtain similar results.

*Example I*

(a) Preparation of a hydroxybenzylated sulfone which is a product made up of a mixture of compounds having the formula:

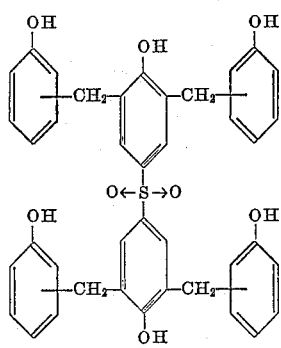

wherein each —CH$_2$— group is attached to the hydroxyphenyl radical in a position which is either ortho or para to the hydroxy group.

Four thousand four hundred and sixty-one grams (12 moles) of 3,3',5,5'-tetramethylol-4,4'-dihydroxydiphenyl sulfone were mixed with 6800 grams (72 moles) of phenol in a reaction vessel. Ten grams of concentrated sulfuric acid were added as a catalyst. The mixture was heated to 120° C. over a period of about 30 minutes at which time the mixture began to reflux. The mixture was refluxed for 3 hours during which time the reflux temperature slowly dropped from 120° C. to 100° C. The excess phenol and water of reaction were distilled off at a temperature of 165° C. and under a vacuum at a pressure of 1.45 inches of mercury, leaving a solid residue. Five thousand eight hundred and five grams of 3,3',5,5'-tetra(hydroxybenzyl) - 4,4' - dihydroxydiphenyl sulfone were obtained as residue. This sulfone was reddish brown and brittle when cooled to room temperature, about 23° C.

(b) Preparation of a polyglycidyl ether by the reaction of the sulfone of (a) and epichlorohydrin: This polyglycidyl ether is a product made up of a mixture of compounds having the formula:

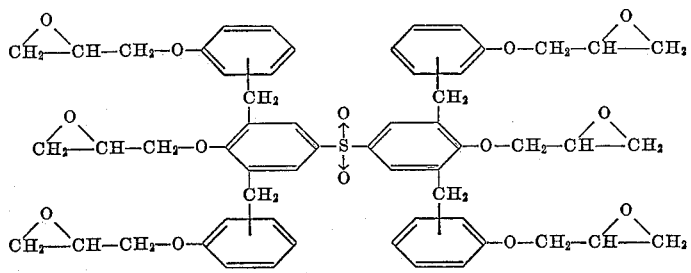

wherein each —CH$_2$— group is attached to the phenylglycidyl ether radical in a position ortho or para to the glycidyl ether group.

Eight hundred and ninety grams of the 3,3',5,5'-tetra(hydroxybenzyl)-dihydroxydiphenyl sulfone were coarse crushed and then dissolved in a mixture of 2220 grams (24 moles) of epichlorohydrin and 500 grams of ethyl alcohol at a temperature of 60° C. Six hundred and seventy-two grams of (50%) sodium hydroxide were added to the mixture over a period of 6 hours while the temperature was held at 60–65° C. The temperature of the mixture was held at 60° C. for an additional 20 minutes and then distilled to a pot temperature of 115° C. in 3 hours. Two thousand ml. of methyl ethyl ketone were slowly added to the hot residue and the resulting mixture was filtered. The filter cake obtained was combined with an additional 500 ml. of methyl ethyl ketone and the resultant mixture filtered. The filtrates from the previous two steps were combined and distilled to a pot temperature of 150° C. in 4 hours. Vacuum was applied gradually to bring the mixture to a temperature of 160° C. and a pressure of 2.2 inches of mercury in 30 minutes. The polyglycidyl ether obtained upon cooling to room temperature, about 23° C., was a dark brown brittle solid having an epoxy equivalency of 214 grams/gram mole epoxy.

(c) Use of the polyglycidyl ether of (b) as a laminating varnish: Twelve sheets of woven glass cloth were saturated with a solution containing 828 grams of the polyglycidyl ether of (b), 8.1 grams of boron trifluoride monoethylamine complex and 150 grams of methyl ethyl ketone and then dried for 10 minutes at 150° C. The fabric had a resin content of 29–34% by weight. Twelve layers of impregnated fabric were pressed into flat panels 14 inches by 14 inches. The panels were prepared by stacking layers of impregnated fabric one on another and subjecting the layers so stacked to a pressure of 300 p.s.i.g., between platens which were at 160° C., for a period of 60 minutes. Each panel was then heated at 205° C. for 6 hours.

The panels so prepared were found to have the following properties:

|  | 23° C. | 149° C. | 204° C. | 260° C. |
|---|---|---|---|---|
| Flexural Strength (p.s.i.) | 95,000 | 69,433 | 43,100 | 28,100 |
| Flexural Modulus (p.s.i.) | 5.11×10⁶ | 4.44×10⁶ | 3.46×10⁶ | 3.56×10⁶ |
| Tensile Strength (p.s.i.) | 48,300 |  |  |  |
| Tensile Modulus (p.s.i.) | 4.08×10⁶ |  |  |  |
| Compressive Strength (p.s.i.) | 57,200 |  |  |  |
| Compressive Modulus (p.s.i.) | 4.20×10⁶ |  |  |  |

Tests noted in this and in subsequent examples were conducted according to the procedures noted below:

Flexural strength, ASTMD D790–58T
Flexural modulus, ASTMD D790–58T
Tensile strength, ASTMD D638–58T
Tensile modulus, ASTMD D638–58T
Compressive strength, ASTMD D695–52T
Compressive modulus, ASTMD D695–52T

*Example II*

(a) Preparation of a polyglycidyl ether from the reaction of 3,3′-di(hydroxybenzyl) - 4,4′ - dihydroxydiphenyl sulfone and epichlorohydrin: This polyglycidyl ether is a product made up of a mixture of compounds having the formula:

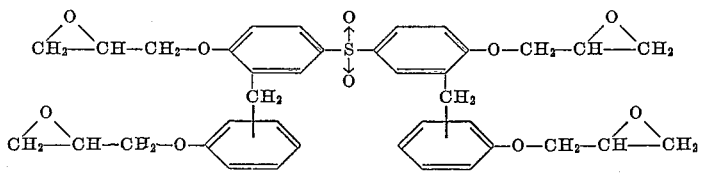

wherein each —CH₂— group is attached to the phenylglycidyl ether radical in a position ortho or para to the glycidyl ether group.

Seven hundred and fifty grams of 3,3′-di(hydroxybenzyl)-4,4′-dihydroxydiphenyl sulfone were dissolved in 1995 grams (21.6 moles) of epichlorohydrin and 504 grams of ethyl alcohol. Six hundred and six grams of (50%) sodium hydroxide were added to the solution over a period of 3½ hours at a temperature of 60–65° C. The reaction mixture was held at 55–60° C. for 20 minutes and then distilled to a pot temperature of 135° C. over a period of 2½ hours to a solid residue. One thousand one hundred and fifty-one grams of methyl isobutyl ketone were added to the residue to dissolve a major portion of the residue and then 1320 grams of water were added to dissolve the rest of the residue. The mixture then contained a brine layer which was drained off the bottom. The residual water was then distilled off the organic layer and the organic layer was filtered. The methyl ethyl ketone was removed by vacuum distillation to 160° C. under a pressure of 2.2 inches of mercury in 2 hours. The last trace of methyl ether ketone and low boiling substances were removed by subjecting the residue to vacuum steam distillation at 160° C. for about 1 hour. The molten product was discharged into a pan and allowed to cool to a brittle solid. The epoxy equivalency was 231 grams/gram mole epoxy and the hydrolyzable chloride content was 1.20%.

(b) Preparation of a polyglycidyl ether from the reaction of 3,5-di(hydroxybenzyl)-4,4′-dihydroxydiphenyl sulfone and epichlorohydrin: This polyglycidyl ether is a product made up of a mixture of compounds having the formula:

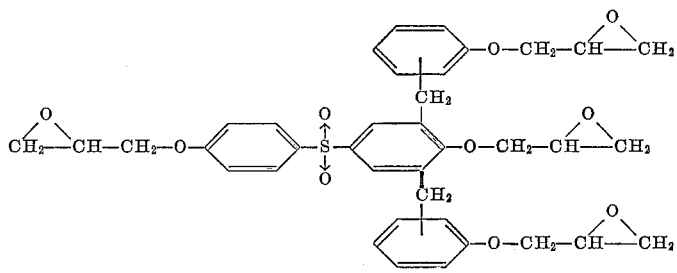

wherein each —CH₂— group is attached to the phenylglycidyl ether radical in a position ortho or para to the glycidyl ether group.

Fifteen hundred grams of 3,5-di(hydroxybenzyl)-4,4′-dihydroxydiphenyl sulfone were dissolved in 3990 grams (43 moles) of epichlorohydrin and 1008 grams of ethyl alcohol. One thousand two hundred and twelve grams of (50%) sodium hydroxide were added over a period of 3½ hours while holding the temperature at 60–65° C. The mixture was held at 55–60° C. for one hour and then heated to 115° C. in 2¾ hours. The organic portion of the residue was dissolved in 3450 grams of methyl ethyl ketone and the solution was filtered to remove any salts. The methyl ethyl ketone was distilled off to conditions of 160° C. under pressure of 2.2 inches of mercury in 4 hours. The residue was subjected to vacuum steam distillation at 160° C. for 1¾ hours leaving the polyglycidyl ether. The polyglycidyl ether obtained upon cooling to room temperature, about 23° C., was a brittle solid having an epoxy equivalency of 231 grams/gram mole epoxy and a hydrolyzable chlorine content of 1.88%.

(c) Use of mixture of polyglycidyl ether from (a) and polyglycidyl ether from (b) as a laminating varnish: Seven hundred and seventy grams of the polyglycidyl ether of (a) and 1830 grams of the polyglycidyl ether of (b) were coarse crushed and dissolved in 1400 grams of methyl ethyl ketone. This solution had a non-volatile content of 64.4% by weight as shown from the residue left after a one gram sample was placed in a 135° C. oven for 3 hours.

Twelve sheets of woven glass cloth were saturated with a solution containing 3000 grams of the solution prepared in (c) above, 46.3 grams of boron trifluoride·monoethylamine complex and 350 grams of acetone. The saturated cloth was then dried for 10 minutes at 150° C. The fabric had a resin content of 33% by weight. Twelve layers of impregnated fabric were pressed into flat panels 14 inches by 14 inches. The panels were prepared by stacking layers of impregnated fabric one on another and subjecting the layers so stacked to a pressure of 300 p.s.i.g., between platens which were at 160° C., for a period of 60 minutes. Each panel was then cured at 205° C. for 6 hours.

The panels so prepared were found to have the following properties:

|  | 23° C. | 260° C. | After 192 Hrs. at 260° C. |
|---|---|---|---|
| Flexural Strength (p.s.i.) | 66,192 | 10,600 | 10,000 |
| Flexural Modulus (p.s.i.) | $3.59 \times 10^6$ | $1.48 \times 10^6$ | $1.43 \times 10^6$ |
| Tensile Strength (p.s.i.) | 44,200 | | |
| Tensile Modulus (p.s.i.) | $2.71 \times 10^6$ | | |
| Compressive Strength (p.s.i.) | 31,500 | | |
| Compressive Modulus (p.s.i.) | $1.77 \times 10^6$ | | |

*Example III*

(a) Preparation of a polyglycidyl ether by the reaction of 3,3′,5-tri(hydroxybenzyl)-4,4′-dihydroxydiphenyl sulfone and epichlorohydrin: This polyglycidyl ether is a product made up of a mixture of compounds having the formula:

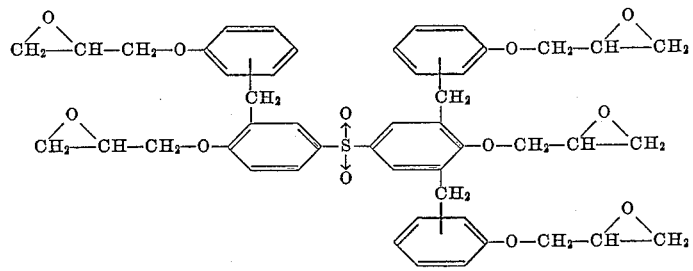

wherein each —CH$_2$— group is attached to the phenyl-glycidyl ether radical in a position ortho or para to the glycidyl ether group.

Two thousand five hundred and three grams of the polyglycidyl ether were prepared from 1800 grams of 3,3′,5-tri(hydroxybenzyl)-4,4′-dihydroxydiphenyl sulfone by the same method as used to prepare the polyglycidyl ether of (b) in Example II using the same equivalents of the materials. This polyglycidyl ether was found to have an epoxy equivalency of 212.5 grams/gram mole epoxy and a hydrolyzable chlorine content of 1.14% by weight.

Two thousand two hundred and twenty grams of the polyglycidyl ether were dissolved in 1195 grams of methyl ethyl ketone and found to have a non-volatile content of 64.6% by weight by the method previously described.

(b) Use of the glycidyl ether of (a) as a laminating varnish: Twelve sheets of woven glass cloth were saturated with a solution containing 3000 grams of the polyglycidyl ether of (a), 46.6 grams of boron trifluoride-monoethylamine complex and 550 grams of acetone. The saturated cloth was then dried for 6 minutes at 150° C. The fabric had a resin content of 36% by weight and a volatile content of 0.19% by weight. Twelve layers of impregnated fabric were pressed into flat panels 14 inches by 14 inches. The panels were prepared by stacking the layers of impregnated fabric one on another and subjecting the layers so stacked to a pressure of 200 p.s.i.g., between platens which were at 160° C., over a period of 60 minutes. Each panel was then cured at 205° C. for 6 hours.

The panels so prepared were found to have the following properties:

|  | 23° C. | 260° C. | After 192 Hrs. at 260° C. |
|---|---|---|---|
| Flexural Strength (p.s.i.) | 67,900 | 28,929 | 10,000 |
| Flexural Modulus (p.si.) | $3.71 \times 10^6$ | $2.92 \times 10^6$ | $1.96 \times 10^6$ |
| Tensile Strength (p.s.i.) | 48,257 | | |
| Tensile Modulus (p.s.i.) | $2.57 \times 10^6$ | | |
| Compressive Strength (p.s.i.) | 29,700 | | |
| Compressive Modulus (p.s.i.) | $1.87 \times 10^6$ | | |

In order to further show the excellent heat resistivity of the polyglycidyl ethers of this invention, the preparation of a laminate was conducted according to the procedure described in I(c) with the exception that diglycidyl ether of 2,2-bis-(p-hydroxyphenyl)-propane having an epoxy equivalency of 192 grams/gram mole epoxy was used in lieu of the tetraglycidyl ether and a stoichiometric amount of 4,4′-methylene dianiline was used in lieu of the boron trifluoride·monoethylamine complex. Laminates so produced had the following properties:

Flexural strength (p.s.i.) at 260° C. __ To poor to obtain any data.

Flexural modulus (p.s.i.) at 204° C. __ 10,600.

In addition to being excellently suited for use as laminating varnishes, the polyglycidyl ethers of this invention, upon the addition thereto of suitable curing agents, can be molded or otherwise shaped into articles which are characterized by excellent heat resistivity.

It is to be understood that all patents and literature references noted in this application are incorporated herein by reference.

What is claimed is:

1. A polyglycidyl ether of the formula:

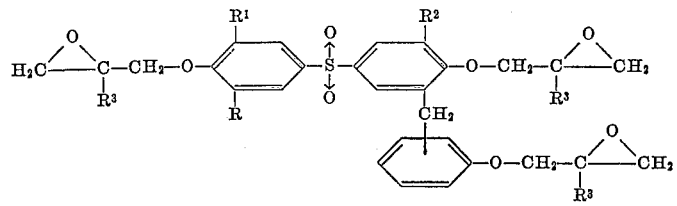

wherein R$^3$ is a member selected from the group consisting of hydrogen atoms and methyl radicals, R, R$^1$ and R$^2$ are members selected from the group consisting of hydrogen atoms and benzylglycidyl ether radicals of the formula:

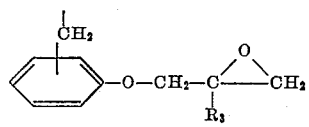

wherein $R^3$ is as previously defined and with the limitation that the methylene radical is attached to the phenyl radical in a position other than meta to the glycidyl ether radical.

2. A polyglycidyl ether as defined in claim 1 wherein R and $R^1$ are hydrogen atoms and $R^2$ is a benzylglycidyl ether radical as defined in claim 1.

3. A polyglycidyl ether as defined in claim 1 wherein R and $R^2$ are hydrogen atoms and $R^1$ is a benzylglycidyl ether radical as defined in claim 1.

4. A polyglycidyl ether as defined in claim 1 wherein R is a hydrogen atom and $R^1$ and $R^2$ are benzylglycidyl ether radicals as defined in claim 1.

5. A polyglycidyl ether as defined in claim 1 wherein R, $R^1$ and $R^2$ are benzylglycidyl ether radicals as defined in claim 1.

6. A polyglycidyl ether as defined in claim 1 wherein R, $R^1$ and $R^2$ are hydrogen atoms.

7. A polyglycidyl ether of the formula:

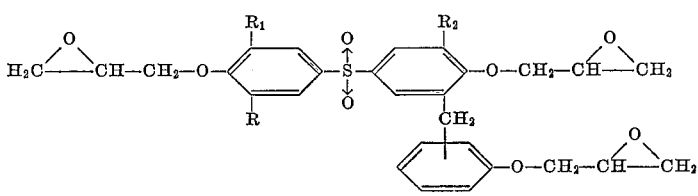

wherein R, $R^1$ and $R^2$ are members selected from the group consisting of hydrogen atoms and benzylglycidyl ether radicals of the formula:

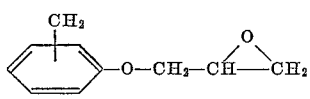

wherein the methylene radical is attached to the phenyl radical in a position other than meta to the glycidyl ether radical.

8. A polyglycidyl ether as defined in claim 7 wherein R and $R^1$ are hydrogen atoms and $R^2$ is a benzylglycidyl ether radical as defined in claim 7.

9. A polyglycidyl ether as defined in claim 7 wherein R and $R^2$ are hydrogen atoms and $R^1$ is a benzylglycidyl ether radical as defined in claim 7.

10. A polyglycidyl ether as defined in claim 7 wherein R is a hydrogen atom and $R^1$ and $R^2$ are benzylglycidyl ether radicals as defined in claim 7.

11. A polyglycidyl ether as defined in claim 7 wherein R, $R^1$ and $R^2$ are benzylglycidyl ether radicals as defined in claim 7.

12. A polyglycidyl ether as defined in claim 7 wherein R, $R^1$ and $R^2$ are hydrogen atoms.

13. A curable composition comprising a polyglycidyl ether of the formula:

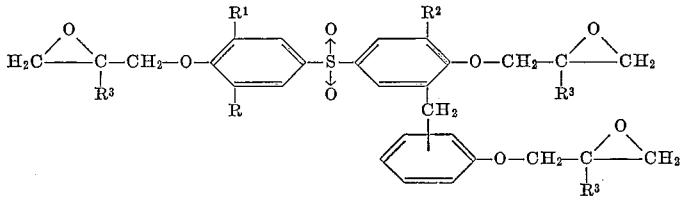

wherein $R^3$ is a member selected from the group consisting of hydrogen atoms and methyl radicals, R, $R^1$ and $R^2$ are members selected from the group consisting of hydrogen atoms and benzylglycidyl ether radicals of the formula:

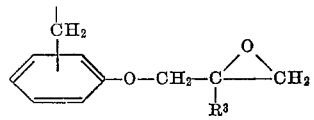

wherein $R^3$ is as previously defined and with the limitation that the methylene radical is attached to the phenyl radical in a position other than meta to the glycidyl ether radical and a curing agent for said polyglycidyl ether wherein said curing agent is present in said composition in an amount sufficient to cure said polyglycidyl ether to an infusible product.

14. The infusible product of the composition defined in claim 13.

15. A curable composition comprising a polyglycidyl ether of the formula:

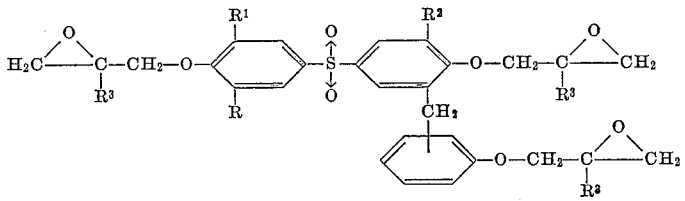

wherein $R^3$ is a member selected from the group consisting of hydrogen atoms and methyl radicals, R, $R^1$ and $R^2$ are members selected from the group consisting of hydrogen atoms and benzylglycidyl ether radicals of the formula:

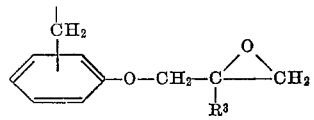

wherein $R^3$ is as previously defined and with the limitation that the methylene radical is attached to the phenyl radical in a position other than meta to the glycidyl ether radical and a hardener for said polyglycidyl ether wherein said hardener is present in said composition in an amount sufficient to cure said polyglycidyl ether to an infusible product.

16. A curable composition as defined in claim 15 wherein said hardener is present in an amount of about 75 percent of stoichiometric to about 15 percent in excess of stoichiometric.

17. A curable composition as defined in claim 15 wherein said hardener is present in an amount of about 90 percent of stoichiometric to about 10 percent in excess of stoichiometric.

18. A curable composition comprising a polyglycidyl ether of the formula:

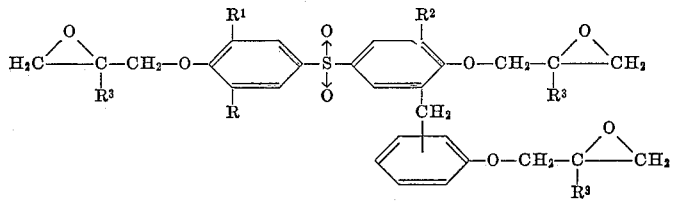

wherein $R^3$ is a member selected from the group consisting of hydrogen atoms and methyl radicals, R, $R^1$ and $R^2$ are members selected from the group consisting of hydrogen atoms and benzylglycidyl ether radicals of the formula:

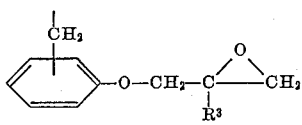

wherein $R^3$ is as previously defined and with the limitation that the methylene radical is attached to the phenyl radical in a position other than meta to the glycidyl ether radical and a catalyst for said polyglycidyl ether wherein said catalyst is present in said composition in an amount sufficient to cure said polyglycidyl ether to an infusible product.

19. A curable composition as defined in claim 18 wherein said catalyst is present in an amount of about 0.2 to about 5% by weight.

20. A curable composition as defined in claim 18 wherein said catalyst is present in an amount of about 0.5 to about 2% by weight.

21. A curable composition comprising a polyglycidyl ether of the formula:

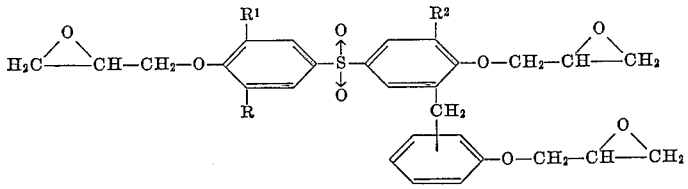

wherein R, $R^1$ and $R^2$ are members selected from the group consisting of hydrogen atoms and benzylglycidyl ether radicals of the formula:

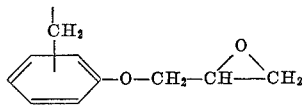

wherein the methylene radical is attached to the phenyl radical in a position other than meta to the glycidyl ether radical and a curing agent for said polyglycidyl ether wherein said curing agent is present in said composition in an amount sufficient to cure said polyglycidyl ether to an infusible product.

22. The infusible product of the composition defined in claim 21.

23. A curable composition comprising a polyglycidyl ether of the formula:

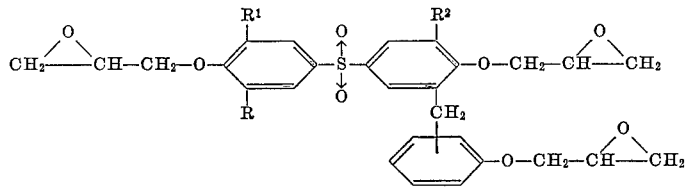

wherein R, $R^1$ and $R^2$ are members selected from the group consisting of hydrogen atoms and benzylglycidyl ether radicals of the formula:

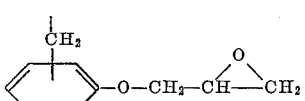

wherein the methylene radical is attached to the phenyl radical in a position other than meta to the glycidyl ether radical and a hardener for said polyglycidyl ether wherein said hardener is present in said composition in an amount sufficient to cure said polyglycidyl ether to an infusible product.

24. A curable composition comprising a polyglycidyl ether of the formula:

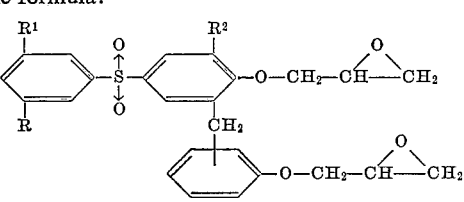

wherein R, $R^1$ and $R^2$ are members selected from the group consisting of hydrogen atoms and benzylglycidyl ether radicals of the formula:

wherein the methylene radical is attached to the phenyl radical in a position other than meta to the glycidyl ether radical and a catalyst for said polyglycidyl ether wherein said catalyst is present in said composition in an amount sufficient to cure said polyglycidyl ether to an infusible product.

25. A curable composition as defined in claim 24 wherein the catalyst used is boron trifluoride monoethylamine complex.

26. A laminate in which the layers of material are bonded together by the cured product of the composition defined in claim 13.

27. A curable composition comprising the polyglycidyl ether of claim 8 and a curing agent therefor in an amount sufficient to cure said polyglycidyl ether to an infusible product.

28. A curable composition comprising the polyglycidyl ether of claim 9 and a curing agent therefor in an amount sufficient to cure said polyglycidyl ether to an infusible product.

29. A curable composition comprising the polyglycidyl ether of claim 10 and a curing agent therefor in an amount sufficient to cure said polyglycidyl ether to an infusible product.

30. A curable composition comprising the polyglycidyl ether of claim 11 and a curing agent therefor in an amount sufficient to cure said polyglycidyl ether to an infusible product.

31. A curable composition comprising the polyglycidyl ether of claim 12 and a curing agent therefor in an amount sufficient to cure said polyglycidyl ether to an infusible product.

References Cited by the Examiner
UNITED STATES PATENTS

| | | | |
|---|---|---|---|
| 2,765,322 | 10/56 | Beavers | 260—47 |
| 3,044,983 | 7/62 | Singley et al. | 260—49 |
| 3,047,426 | 7/62 | Murdock et al. | 260—49 |

WILLIAM H. SHORT, *Primary Examiner.*

HAROLD N. BURSTEIN, *Examiner.*